US008545304B2

(12) United States Patent
Aoki et al.

(10) Patent No.: US 8,545,304 B2
(45) Date of Patent: Oct. 1, 2013

(54) WAGERING GAME WITH BONUS GAME TRIGGERED BY LINKED TERMINAL

(75) Inventors: Dion K. Aoki, Henderson, NV (US); Jason C. Gilmore, Scottsdale, AZ (US); Thomas M. Kopera, Villa Park, IL (US); Christy Juinsuk Olsen, Henderson, NV (US)

(73) Assignee: WMS Gaming Inc., Waukegan, IL (US)

( * ) Notice: Subject to any disclaimer, the term of this patent is extended or adjusted under 35 U.S.C. 154(b) by 1240 days.

(21) Appl. No.: 11/238,218

(22) Filed: Sep. 29, 2005

(65) Prior Publication Data

US 2006/0079318 A1 Apr. 13, 2006

Related U.S. Application Data

(60) Provisional application No. 60/614,567, filed on Sep. 30, 2004.

(51) Int. Cl.
*A63F 13/00* (2006.01)

(52) U.S. Cl.
USPC .................................. 463/20; 463/25; 463/42

(58) Field of Classification Search
USPC ................................................ 463/20, 25, 42
See application file for complete search history.

(56) References Cited

U.S. PATENT DOCUMENTS

| | | | | |
|---|---|---|---|---|
| 4,624,459 | A | 11/1986 | Kaufman | 273/143 R |
| 4,837,728 | A | 6/1989 | Barrie et al. | 364/412 |
| 4,948,134 | A | 8/1990 | Suttle et al. | 273/85 |
| 5,116,055 | A | 5/1992 | Tracy | 273/138 A |
| 5,249,800 | A | 10/1993 | Hilgendorf et al. | 273/138 A |
| 5,275,400 | A | 1/1994 | Weingardt et al. | 463/12 |
| 5,280,909 | A | 1/1994 | Tracy | 273/138 A |
| 5,344,144 | A | 9/1994 | Canon | 273/138 A |
| 5,377,973 | A | 1/1995 | Jones et al. | 273/85 CP |
| 5,393,057 | A | 2/1995 | Marnell | 273/85 CP |
| 5,524,888 | A | 6/1996 | Heidel | 463/22 |
| 5,544,892 | A | 8/1996 | Breeding | 273/292 |
| 5,564,700 | A | 10/1996 | Celona | 463/27 |
| 5,580,063 | A | 12/1996 | Edwards | 273/378 |
| 5,580,309 | A | 12/1996 | Piechowiak et al. | 463/16 |
| 5,611,730 | A | 3/1997 | Weiss | 463/20 |
| 5,645,486 | A | 7/1997 | Nagao et al. | 463/27 |

(Continued)

FOREIGN PATENT DOCUMENTS

| | | | |
|---|---|---|---|
| CA | 2334546 | A1 | 8/2001 |
| DE | 195 15 983 | A1 | 11/1996 |

(Continued)

OTHER PUBLICATIONS

Article for "Easy Riches" by Sigma Game, Strictly Slots, 1 page (Aug. 2001).

(Continued)

*Primary Examiner* — David L Lewis
*Assistant Examiner* — William H McCulloch, Jr.
(74) *Attorney, Agent, or Firm* — Nixon Peabody LLP

(57) ABSTRACT

The present invention is directed to a gaming terminal and a method of playing a wagering game, whereby a player at one gaming terminal is allowed to link to other gaming terminals via a player-selectable option. The wagering game may include a basic game and a bonus game. Once linked, the player can enter a bonus game that is triggered by an outcome at a linked terminal.

24 Claims, 4 Drawing Sheets

(56) References Cited

U.S. PATENT DOCUMENTS

| | | | | |
|---|---|---|---|---|
| 5,655,961 | A | 8/1997 | Acres et al. | 463/27 |
| 5,766,076 | A | 6/1998 | Pease et al. | 463/27 |
| 5,772,509 | A * | 6/1998 | Weiss | 463/16 |
| 5,779,549 | A | 7/1998 | Walker et al. | 463/42 |
| 5,797,794 | A * | 8/1998 | Angell | 463/18 |
| 5,816,918 | A | 10/1998 | Kelly et al. | 463/16 |
| 5,823,874 | A | 10/1998 | Adams | 463/17 |
| 5,830,063 | A | 11/1998 | Byrne | 463/18 |
| 5,848,932 | A | 12/1998 | Adams | 463/20 |
| 5,855,515 | A | 1/1999 | Pease et al. | 463/27 |
| 5,876,284 | A | 3/1999 | Acres et al. | 463/25 |
| 5,885,158 | A | 3/1999 | Torango et al. | 463/27 |
| 5,909,486 | A * | 6/1999 | Walker et al. | 379/114.11 |
| 5,941,773 | A | 8/1999 | Harlick | 463/26 |
| 6,007,427 | A | 12/1999 | Wiener et al. | 463/17 |
| 6,012,982 | A | 1/2000 | Piechowiak et al. | 463/16 |
| 6,039,648 | A | 3/2000 | Guinn et al. | 463/16 |
| 6,047,963 | A | 4/2000 | Pierce et al. | 273/121 B |
| 6,077,162 | A | 6/2000 | Weiss | 463/26 |
| 6,089,977 | A | 7/2000 | Bennett | 463/20 |
| 6,089,980 | A | 7/2000 | Gauselmann | 463/27 |
| 6,102,474 | A | 8/2000 | Daley | 296/836 |
| 6,102,798 | A | 8/2000 | Bennett | 463/16 |
| 6,102,799 | A | 8/2000 | Stupak | 463/27 |
| 6,110,043 | A | 8/2000 | Olsen | 463/27 |
| 6,139,013 | A | 10/2000 | Pierce et al. | 273/121 B |
| 6,142,872 | A | 11/2000 | Walker et al. | 463/16 |
| 6,146,273 | A | 11/2000 | Olsen | 463/27 |
| 6,155,925 | A | 12/2000 | Giobbi et al. | 463/20 |
| 6,158,741 | A | 12/2000 | Koelling | 273/292 |
| 6,159,097 | A | 12/2000 | Gura | 463/20 |
| 6,168,523 | B1 | 1/2001 | Piechowiak et al. | 463/26 |
| 6,203,010 | B1 | 3/2001 | Jorasch et al. | 273/138.1 |
| 6,206,374 | B1 | 3/2001 | Jones | 273/292 |
| 6,206,782 | B1 | 3/2001 | Walker et al. | 463/25 |
| 6,210,275 | B1 | 4/2001 | Olsen | 463/16 |
| 6,210,277 | B1 | 4/2001 | Stefan | 463/27 |
| 6,217,448 | B1 | 4/2001 | Olsen | 463/25 |
| 6,220,593 | B1 | 4/2001 | Pierce et al. | 273/138.1 |
| 6,224,482 | B1 | 5/2001 | Bennett | 463/20 |
| 6,224,484 | B1 | 5/2001 | Okuda et al. | 463/27 |
| 6,231,445 | B1 | 5/2001 | Acres | 463/42 |
| 6,254,483 | B1 | 7/2001 | Acres | 463/26 |
| 6,309,299 | B1 * | 10/2001 | Weiss | 463/20 |
| 6,312,332 | B1 | 11/2001 | Walker et al. | 463/23 |
| 6,315,660 | B1 | 11/2001 | DeMar et al. | 463/16 |
| 6,319,125 | B1 | 11/2001 | Acres | 463/25 |
| 6,319,127 | B1 | 11/2001 | Walker et al. | 463/26 |
| 6,336,859 | B2 | 1/2002 | Jones et al. | 463/13 |
| 6,336,862 | B1 | 1/2002 | Byrne | 463/27 |
| 6,345,824 | B1 | 2/2002 | Selitzky | 273/292 |
| 6,358,149 | B1 | 3/2002 | Schneider et al. | 463/27 |
| 6,361,441 | B1 | 3/2002 | Walker et al. | 463/42 |
| 6,364,768 | B1 | 4/2002 | Acres et al. | 463/25 |
| 6,375,567 | B1 | 4/2002 | Acres | 463/25 |
| 6,375,568 | B1 | 4/2002 | Roffman et al. | 463/26 |
| 6,416,408 | B2 | 7/2002 | Tracy et al. | 463/16 |
| 6,416,409 | B1 | 7/2002 | Jordan | 463/27 |
| 6,422,940 | B1 | 7/2002 | Walker et al. | 463/13 |
| 6,431,983 | B2 | 8/2002 | Acres | 463/25 |
| 6,435,968 | B1 | 8/2002 | Torango | 463/27 |
| 6,439,995 | B1 | 8/2002 | Hughs-Baird et al. | 463/20 |
| 6,482,089 | B2 | 11/2002 | DeMar et al. | 463/20 |
| 6,503,146 | B2 * | 1/2003 | Walker et al. | 463/25 |
| 6,506,117 | B2 | 1/2003 | DeMar et al. | 463/20 |
| 6,508,707 | B2 | 1/2003 | DeMar et al. | 463/16 |
| 6,517,433 | B2 | 2/2003 | Loose et al. | 463/20 |
| 6,520,855 | B2 | 2/2003 | DeMar et al. | 463/20 |
| 6,589,115 | B2 | 7/2003 | Walker et al. | 463/25 |
| 6,592,460 | B2 | 7/2003 | Torango | 463/27 |
| 6,599,186 | B1 | 7/2003 | Walker et al. | 463/17 |
| 6,599,188 | B2 | 7/2003 | Hirsch et al. | 463/19 |
| 6,599,193 | B2 | 7/2003 | Baerlocher et al. | 463/27 |
| 6,648,753 | B1 | 11/2003 | Tracy et al. | 463/16 |
| 6,648,762 | B2 | 11/2003 | Walker et al. | 463/25 |
| 6,692,354 | B2 | 2/2004 | Tracy et al. | 463/16 |
| 6,712,695 | B2 | 3/2004 | Mothwurf et al. | 463/25 |
| 6,712,699 | B2 | 3/2004 | Walker et al. | 463/30 |
| 6,733,390 | B2 | 5/2004 | Walker et al. | 463/23 |
| 6,790,141 | B2 | 9/2004 | Muir | 463/42 |
| 6,837,788 | B2 * | 1/2005 | Cannon | 463/16 |
| 6,837,793 | B2 | 1/2005 | McClintic | 463/42 |
| 6,869,361 | B2 | 3/2005 | Sharpless et al. | 463/25 |
| 7,008,319 | B2 * | 3/2006 | Montgomery et al. | 463/21 |
| 7,097,562 | B2 * | 8/2006 | Gagner | 463/42 |
| 7,192,351 | B2 * | 3/2007 | Rozkin et al. | 463/40 |
| 7,311,598 | B2 * | 12/2007 | Kaminkow et al. | 463/16 |
| 7,311,604 | B2 * | 12/2007 | Kaminkow et al. | 463/20 |
| 7,347,775 | B2 * | 3/2008 | Roemer | 463/16 |
| 7,427,236 | B2 * | 9/2008 | Kaminkow et al. | 463/26 |
| 7,448,949 | B2 * | 11/2008 | Kaminkow et al. | 463/26 |
| 7,775,873 | B2 * | 8/2010 | Aoki et al. | 463/20 |
| 7,833,094 | B2 * | 11/2010 | Englman et al. | 463/25 |
| 7,980,954 | B2 * | 7/2011 | Gagner et al. | 463/42 |
| 8,216,048 | B2 * | 7/2012 | Cowan et al. | 463/18 |
| 8,262,456 | B2 * | 9/2012 | Englman et al. | 463/20 |
| 8,292,731 | B2 * | 10/2012 | Collette et al. | 463/26 |
| 8,303,402 | B2 * | 11/2012 | Aoki et al. | 463/27 |
| 8,409,014 | B2 * | 4/2013 | Gagner et al. | 463/42 |
| 8,449,387 | B2 * | 5/2013 | Englman et al. | 463/27 |
| 2001/0004606 | A1 * | 6/2001 | Tracy et al. | 463/16 |
| 2002/0002073 | A1 * | 1/2002 | Montgomery et al. | 463/13 |
| 2002/0025845 | A1 * | 2/2002 | Cannon | 463/16 |
| 2002/0138594 | A1 | 9/2002 | Rowe | 709/219 |
| 2002/0151345 | A1 | 10/2002 | Byrne | 463/18 |
| 2002/0155874 | A1 | 10/2002 | Byrne | 463/16 |
| 2003/0027618 | A1 | 2/2003 | Byrne | 463/16 |
| 2003/0036430 | A1 | 2/2003 | Cannon | 463/42 |
| 2003/0045337 | A1 | 3/2003 | Byrne | 463/16 |
| 2003/0050106 | A1 | 3/2003 | Lyfoung | 463/13 |
| 2003/0060258 | A1 * | 3/2003 | Coleman et al. | 463/16 |
| 2003/0064776 | A1 | 4/2003 | Byrne | 463/16 |
| 2003/0064807 | A1 | 4/2003 | Walker et al. | 463/42 |
| 2003/0092485 | A1 * | 5/2003 | Seelig et al. | 463/25 |
| 2003/0100361 | A1 * | 5/2003 | Sharpless et al. | 463/25 |
| 2003/0148808 | A1 | 8/2003 | Price | 463/27 |
| 2003/0181231 | A1 | 9/2003 | Vancura et al. | 463/9 |
| 2003/0186733 | A1 | 10/2003 | Wolf et al. | 463/16 |
| 2003/0216166 | A1 | 11/2003 | Baerlocher et al. | 463/20 |
| 2003/0222402 | A1 | 12/2003 | Olive | 273/292 |
| 2003/0224852 | A1 | 12/2003 | Walker et al. | 463/20 |
| 2003/0228899 | A1 | 12/2003 | Evans | 463/25 |
| 2003/0236116 | A1 | 12/2003 | Marks et al. | 463/16 |
| 2004/0009808 | A1 | 1/2004 | Gauselmann | 463/25 |
| 2004/0009811 | A1 | 1/2004 | Torango | 463/25 |
| 2004/0030654 | A1 * | 2/2004 | Walker et al. | 705/53 |
| 2004/0038741 | A1 | 2/2004 | Gauselmann | 463/42 |
| 2004/0048644 | A1 | 3/2004 | Gerrard et al. | 463/16 |
| 2004/0106448 | A1 | 6/2004 | Gauselmann | 463/25 |
| 2004/0204226 | A1 | 10/2004 | Foster et al. | 463/20 |
| 2004/0204235 | A1 | 10/2004 | Walker et al. | 463/29 |
| 2004/0235552 | A1 | 11/2004 | Gauselmann | 463/16 |
| 2004/0242297 | A1 | 12/2004 | Walker et al. | 463/13 |
| 2004/0242303 | A1 | 12/2004 | Walker et al. | 463/16 |
| 2004/0248651 | A1 * | 12/2004 | Gagner | 463/42 |
| 2005/0014554 | A1 | 1/2005 | Walker et al. | 463/20 |
| 2005/0026674 | A1 | 2/2005 | Wolf et al. | 463/16 |
| 2006/0019734 | A1 * | 1/2006 | Roemer | 463/16 |
| 2006/0079318 | A1 * | 4/2006 | Aoki et al. | 463/25 |
| 2006/0079319 | A1 * | 4/2006 | Aoki et al. | 463/25 |
| 2009/0124366 | A1 * | 5/2009 | Aoki et al. | 463/27 |
| 2010/0197385 | A1 * | 8/2010 | Aoki et al. | 463/27 |
| 2011/0053683 | A1 * | 3/2011 | Aoki et al. | 463/26 |
| 2011/0105233 | A1 * | 5/2011 | Aoki | 463/42 |
| 2011/0312410 | A1 * | 12/2011 | Aoki et al. | 463/25 |
| 2013/0116028 | A1 * | 5/2013 | Aoki et al. | 463/16 |

FOREIGN PATENT DOCUMENTS

| | | | |
|---|---|---|---|
| DE | 196 24 321 | A1 | 1/1998 |
| EP | 0 521 599 | A1 | 1/1993 |
| GB | 2 153 572 | A | 8/1985 |

| | | | |
|---|---|---|---|
| GB | 2 181 589 | A | 4/1987 |
| GB | 2 242 300 | A | 9/1991 |
| GB | 2 313 792 | A | 10/1997 |
| GB | 2 333 880 | | 8/1999 |
| WO | WO 99/03078 | A1 | 1/1999 |
| WO | WO 99/19037 | A1 | 4/1999 |
| WO | WO 01/33478 | A1 | 5/2001 |
| WO | WO 03/026754 | A1 | 4/2003 |
| WO | WO 03/083789 | A1 | 10/2003 |

OTHER PUBLICATIONS

Article for “Millioniser” by Glenn Haussman, Strictly Slots, pp. 50-53 (Mar. 2004).

Product Sheet for “Big Games Safari,” IGT, 24 pages (2000).

“New ’97 Games,” International Gaming & Wagering Business, 24 pages (Mar. 1997).

* cited by examiner

WAGERING GAME WITH BONUS GAME TRIGGERED BY LINKED TERMINAL

CROSS-REFERENCE TO RELATED APPLICATIONS

This application claims the benefit of priority of U.S. Provisional Patent Application No. 60/614,567, filed Sep. 30, 2004, which is hereby incorporated by reference in its entirety.

FIELD OF THE INVENTION

The present invention relates generally to gaming terminals and methods of playing wagering games at the gaming terminals and, more particularly, to gaming terminals and methods of playing wagering games at gaming terminals whereby a first gaming terminal is linked to other gaming terminals, and wherein a player at the first gaming terminal is allowed to enter a bonus game that is triggered by game play at the other linked terminals.

BACKGROUND OF THE INVENTION

Gaming machines, such as slot machines, video poker machines, and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning each machine is roughly the same (or believed to be the same), players are most likely to be attracted to the most entertaining and exciting of the machines.

Consequently, shrewd operators strive to employ the most entertaining and exciting machines available because such machines attract frequent play and, hence, increase profitability to the operator. In the competitive gaming machine industry, there is a continuing need for gaming machine manufacturers to produce new types of games, or enhancements to existing games, which will attract frequent play by enhancing the entertainment value and excitement associated with the game.

One concept that has been successfully employed to enhance the entertainment value of a game is that of a "bonus" game which may be played in conjunction with a "basic" game. The bonus game may comprise any type of game, either similar to or completely different from the basic game, and is entered upon the occurrence of a selected event or outcome of the basic game. Such a bonus game produces a significantly higher level of player excitement than the basic game because it provides a greater expectation of winning than the basic game.

Another concept that has been employed is the use of a progressive jackpot. In the gaming industry, a "progressive" involves collecting coin-in data from participating gaming device(s) (e.g., slot machines), contributing a percentage of that coin-in data to a jackpot amount, and awarding that jackpot amount to a player upon the occurrence of a certain jackpot-won event. The percentage of the coin-in is determined prior to any result being achieved and is independent of any result. A jackpot-won event typically occurs when a "progressive winning position" is achieved at a participating gaming device. If the gaming device is a slot machine, a progressive winning position may, for example, correspond to alignment of progressive jackpot reel symbols along a certain payline. The initial progressive jackpot is a predetermined minimum amount. That jackpot amount, however, progressively increases as players continue to play the gaming machine without winning the jackpot. Further, when several gaming machines are linked together such that several players at several gaming machines compete for the same jackpot, the jackpot progressively increases at a much faster rate, which leads to further player excitement.

In many basic games, bonus games, and progressive games, game play is a function of randomly selected outcomes at a single gaming terminal. Accordingly, a player is seldom interested in what is going on at other gaming terminals. A further enhancement of the gaming experience would allow players to share in gaming activity at other gaming terminals. For example, game play at one gaming terminal may influence game play at another gaming terminal. Providing a shared gaming experience allows players to become participants in an arena larger than his or her single gaming terminal. This increases the excitement level as players have a stake in the outcomes at gaming terminals other than their own.

Thus, the present invention provides further enhancement of the gaming experience by increasing the anticipation of future winnings based on the outcomes at other gaming terminals. The present invention provides for a player-selectable option to link to other gaming terminals, and once linked, allows a player to enter a bonus game based on the outcome in a linked gaming terminal. Thus, a player's expectation of winning is increased via an increased chance of entering a bonus game.

SUMMARY OF THE INVENTION

According to one embodiment of the present invention, the needs mentioned above are met by a gaming terminal for playing a wagering game having a basic game and a bonus game. The basic game has a plurality of symbols that indicate a randomly selected outcome in response to a wager input by a player. The basic game also has a player-selectable option for linking to another gaming terminal. The bonus game is triggered by an outcome in a linked gaming terminal once the player-selectable option for linking is activated.

According to another embodiment of the invention, a method of playing a wagering game is disclosed that provides a basic game and a bonus game at a first gaming terminal. A selection is received via a player-selectable option at the first gaming terminal for linking to a second gaming terminal. Accordingly, the second gaming terminal is linked to the first gaming terminal. Upon achieving a start-bonus-game outcome in the second gaming terminal, the bonus game is triggered in the first gaming terminal.

According to another embodiment of the invention, a gaming system is comprised of a plurality of gaming terminals and a controller. The gaming terminals are capable of being linked to other gaming terminals. The controller operates to link the plurality of gaming terminals. Once linked, the controller receives a bonus-game-eligibility signal from a first gaming terminal in response to a certain event occurring at the first gaming terminal. The bonus-game-eligibility signal allows the first gaming terminal to play a bonus game in response to a certain game outcome that occurs at a second gaming terminal. The controller also transmits a bonus-game activating signal to the first gaming terminal in response to the certain game outcome occurring at the second gaming terminal.

According to another embodiment of the invention, a gaming terminal for playing a wagering game includes a wagering game that has a plurality of symbols that indicate a randomly selected outcome in response to a wager input by a player. The gaming terminal also includes a player-selectable option for linking to another gaming terminal, and a means for activating the player-selectable option. Once the player-selectable option is activated, the gaming terminal is linked to another gaming terminal such that both of the gaming terminals enter a second wagering game in response to a certain event.

According to another embodiment of the invention, a method of playing a wagering game at a gaming terminal provides a wagering game that has a plurality of symbols that indicate a randomly selected outcome in response to a wager input by a player. A player-selectable option on the gaming terminal for linking to another second gaming terminal is activated, and the gaming terminal and the other second gaming terminal are linked. A bonus game is provided at each of the terminals based on a start-bonus-outcome at one of the terminals.

The above summary of the present invention is not intended to represent each embodiment or every aspect of the present invention. The detailed description and Figures will describe many of the embodiments and aspects of the present invention.

BRIEF DESCRIPTION OF THE DRAWINGS

The foregoing and other advantages of the invention will become apparent upon reading the following detailed description and upon reference to the drawings.

Figure 1:
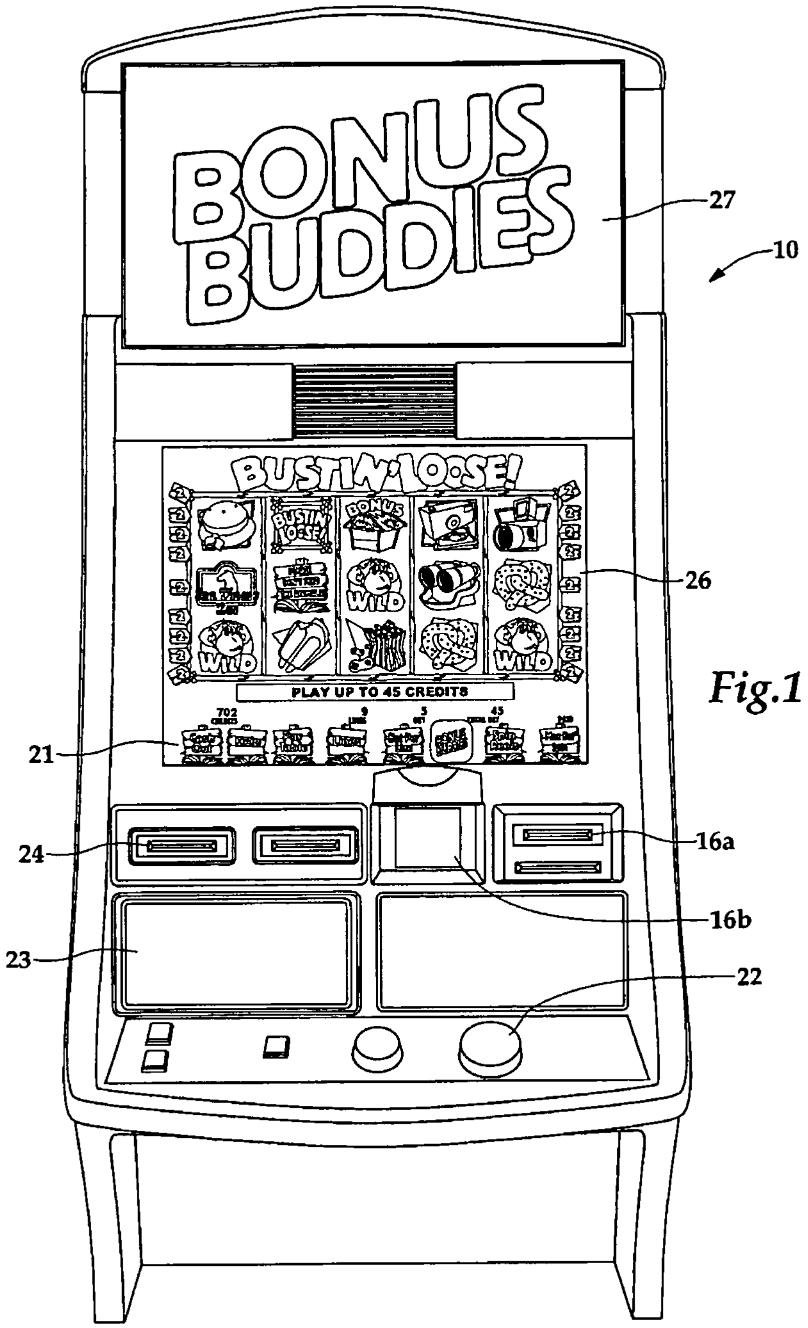
FIG. 1 is a perspective view of a video gaming terminal according to one embodiment of the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DESCRIPTION OF ILLUSTRATIVE EMBODIMENTS

The present invention is directed to a gaming terminal and a method of playing a wagering game, whereby a player at one gaming terminal is allowed to link to other gaming terminals via a player-selectable option. The wagering game may include a basic game and a bonus game. Once linked, the player is able to enter a bonus game that is triggered by an outcome at a linked terminal.

FIG. 1 shows a perspective view of a typical gaming terminal 10 used by gaming establishments, such as casinos. With regard to the present invention, the gaming terminal 10 may be any type of gaming terminal and may have varying structures and methods of operation. For example, the gaming terminal 10 may be a mechanical gaming terminal configured to play mechanical slots, or it may be an electromechanical or electrical gaming terminal configured to play video slots or a video casino game, such as blackjack, slots, keno, poker, etc.

As shown, the gaming terminal 10 includes input devices, such as a wager acceptor 16 (shown as a card wager acceptor 16*a* and a cash wager accepter 16*b*), a touch screen 21, a push-button panel 22, and an information reader 24. For outputs, the gaming terminal 10 includes a payout mechanism 23, a main display 26 for displaying information about the basic wagering game, and a secondary display 27 that may display an electronic version of a pay table, a bonus game and/or also possibly game-related information or other entertainment features. While these typical components found in the gaming terminal 10 are described below, it should be understood that numerous other elements may exist and may be used in any number of combinations to create various forms of a gaming terminal.

The wager acceptor 16 may be provided in many forms, individually or in combination. The cash wager acceptor 16*a* may include a coin slot acceptor or a note acceptor to input value to the gaming terminal 10. The card wager acceptor 16*b* may include a card-reading device for reading a card that has a recorded monetary value with which it is associated. The card wager acceptor 16*b* may also receive a card that authorizes access to a central account, which can transfer money to the gaming terminal 10.

Also included is the payout mechanism 23, which performs the reverse functions of the wager acceptor. For example, the payout mechanism 23 may include a coin dispenser or a note dispenser to output value from gaming terminal 10. Also, the payout mechanism 23 may also be adapted to receive a card that authorizes the gaming terminal 10 to transfer credits from the gaming terminal 10 to a central account.

The push button panel 22 is typically offered, in addition to the touch screen 21, to provide players with an option on how to make their game selections. Alternatively, the push button panel 22 provides inputs for one aspect of operating the game, while the touch screen 21 allows for inputs needed for another aspect of operating the game.

The outcome of the basic wagering game is displayed to the player on the main display 26. The main display 26 may take the form of a cathode ray tube (CRT), a high resolution LCD, a plasma display, LED, or any other type of video display suitable for use in the gaming terminal 10. As shown, the main display 26 includes the touch screen 21 overlaying the entire monitor (or a portion thereof) to allow players to make game-related selections. Alternatively, the gaming terminal 10 may have a number of mechanical reels to display the game outcome, as well.

In some embodiments, the information reader 24 is a card reader that allows for identification of a player by reading a card with information indicating his or her true identity. Currently, identification is used by casinos for rewarding certain players with complimentary services or special offers. For example, a player may be enrolled in the gaming establishment's players' club and may be awarded certain complimentary services as that player collects points in his or her player-tracking account. The player inserts his or her card into the player-identification card reader 24, which allows the casino's computers to register that player's wagering at the gaming terminal 10. The information reader 24 may also include a keypad (not shown) for entering a personal identification number (PIN). The gaming terminal 10 may require that the player enter their PIN prior to obtaining information. The gaming terminal 10 may use the secondary display 27 for providing the player with information about his or her account or other player-specific information. Also, in some embodiments, the information reader 24 may be used to restore assets that the player achieved during a previous game session and had saved.

Figure 2:
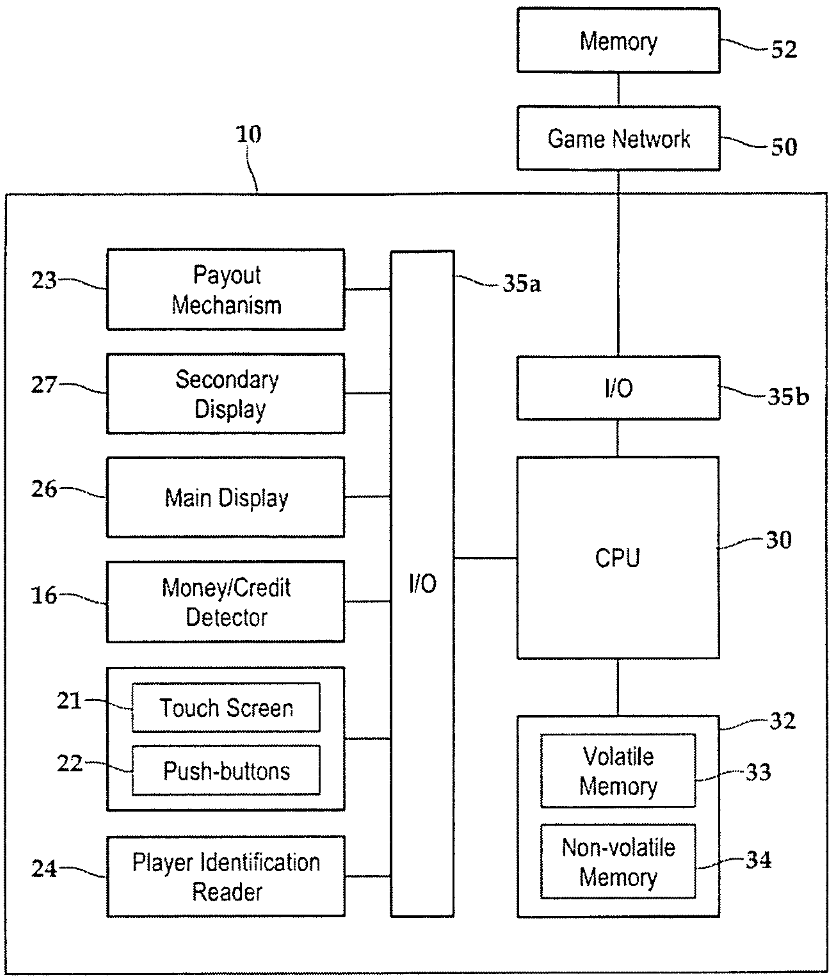
FIG. 2 is a block diagram of the gaming terminal of FIG. 1.

As shown in FIG. 2, the various components of the gaming terminal 10 are controlled by a central processing unit (CPU) 30 (such as a microprocessor or microcontroller). To provide the gaming functions, the CPU 30 executes a game program that allows for the randomly selected outcome. The CPU 30 is also coupled to or includes a local memory 32. The local memory 32 may comprise a volatile memory 33 (e.g., a random-access memory (RAM)) and a non-volatile memory 34 (e.g., an EEPROM). It should be appreciated that the CPU 30 may include one or more microprocessors. Similarly, the local memory 32 may include multiple RAM and multiple program memories.

Communications between the peripheral components of the gaming terminal 10 and the CPU 30 occur through input/output (I/O) circuits 35*a*. As such, the CPU 30 also controls and receives inputs from the peripheral components of the gaming terminal 10. Further, the CPU 30 communicates with external systems via the I/O circuits 35*b*. Although the I/O circuits 35 may be shown as a single block, it should be appreciated that the I/O circuits 35 may include a number of different types of I/O circuits.

It should be noted that the operation of the gaming terminal 10 can be controlled by a controller within the game network 50. As such, after receiving a wager at the gaming terminal 10, the random selection of the outcome occurs within the game network 50. The game network 50 then communicates the random outcome to the gaming terminal 10, which then displays symbols indicative of that outcome. In this alternative, the gaming terminal 10 is used for receiving inputs from the player and displaying outputs to the player.

Specifically, the controller can operate to send and receive signals in response to certain events that occur at the gaming terminals. For example, a controller may receive a bonus-game-eligibility signal from a first gaming terminal in response to a certain event that occurs at the first gaming terminal. The bonus-game-eligibility signal may allow the first gaming terminal to play a bonus game in response to a certain outcome that occurs at a second gaming terminal. Once a certain outcome occurs at the second gaming terminal, the controller can operate to transmit a bonus-game-activating signal to the first gaming terminal which triggers the bonus game to begin.

The game network 50 can be used to operate certain games, such as bonus games or progressive games that are contributed to by all or some of the gaming terminals 10 in the game network 50 (e.g., terminal-level jackpots that only each gaming terminal 10 contributes to, bank-level jackpots that are contributed to by all of the gaming terminals 10 in a particular bank, and wide-area jackpots that are contributed to by a larger number of gaming terminals 10, such as multiple banks). As described below, the game network 50 can be used to provide the selection of the gaming terminals 10 within the game network 50 that will be participating in the "Bonus Buddy" bonus game. It can also be used for transferring information between or among gaming terminals 10 that are participating in the "Bonus Buddy" bonus game.

The game network 50 can also allow a player to retrieve assets obtained while playing at one gaming terminal 10 at a different gaming terminal that is part of the game network 50. Assets may be any number of things, including, but not limited to, monetary or non-monetary awards, features that a player builds up in a bonus or progressive game to win awards, etc. In some embodiments, these assets can be saved by a player in a memory device 32, 52 and restored by the player in a later gaming session via the memory device 32, 52 located within or external to the gaming terminal 10.

In one embodiment related to the present invention, one such asset may be a "permanent buddy" or a number of "permanent buddies" that are stored in the memory device 32, 52 of the game network 50. A permanent buddy can be selected by the player and added to the player's list of assets, so that any time the permanent buddy begins play of a wagering game, he or she is identified via the information reader 24 and information relating to his or her game play is stored in the memory device 32, 52. Thus, with a "permanent buddy," a player does not need to be playing at a gaming terminal simultaneously with his or her buddy. Instead, a player would be allowed to play an accumulated bonus game at a gaming terminal 10 that was based on the play of the buddy at an earlier gaming session.

Figure 3:
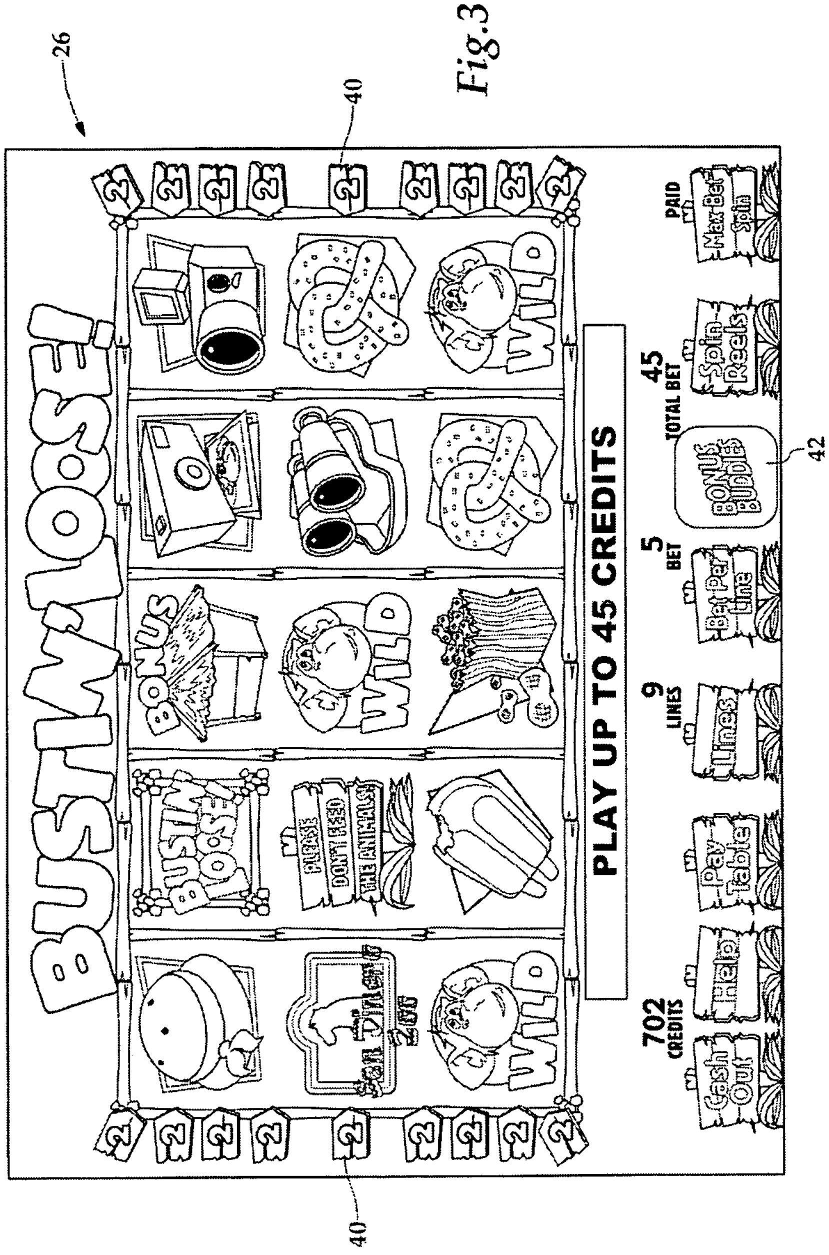
FIG. 3 illustrates a main display of a gaming terminal of FIG. 1 for displaying a basic game or a bonus game according to one embodiment of the present invention

The main display 26 of one embodiment of the present invention is shown in more detail in FIG. 3. In this embodiment, the basic wagering game is a slot machine game having five different reels. The reels may be either traditional mechanical reels or they may be computer-generated images of reels, with each reel composed of a plurality of symbols. In response to a wager input by a player, each of the paylines 40 indicates a randomly selected outcome as a combination of symbols on the reels. While multiple paylines 40 are shown, a gaming terminal 10 with a single payline will also work with the present invention.

In the preferred embodiment of the present invention, the wagering game also includes a player-selectable option 42. In FIG. 3, this player-selectable option 42, labeled as "Bonus Buddies," is located below the main display 26, but may be placed at any location on the gaming terminal 10. The player-selectable option 42 allows a player at the gaming terminal 10 to link to other gaming terminals. This linking is accomplished via the game network 50 (FIG. 2). Once linked, the game play at one gaming terminal may be influenced by game play at one or more other gaming terminals.

The player-selectable option 42 may be activated by a second wager input by a player. To activate, a player may be required to input a minimum second wager input and may be limited to a maximum second wager input. The amount of the second wager input corresponds to a predetermined number of spins at a linked gaming terminal, i.e. 5 credits equals one Bonus Buddy spin.

Alternatively, the player-selectable option 42 for linking to other gaming terminals may be activated via a "Buddy" outcome in the basic game that awards "Buddy" credits that can be used for linking to other gaming terminals. A player may be given the option of using the "Buddy" credits instantly or at a later time. The number of "Buddy" credits needed to link to other gaming terminals may have a minimum number, i.e., 5 "Buddy" credits. The player's terminal and the "Buddy" terminal may then be linked such that the player, or both the player and the Buddy, can participate in the "Bonus Buddy" game. Alternatively, the player-selectable option 42 for linking to other gaming terminals may be activated via a "Buddy" symbol that appears anywhere on the display, i.e., a scatter bonus. When a "Buddy" symbol appears, the player is allowed to select another gaming terminal to which to be linked.

Figure 4:
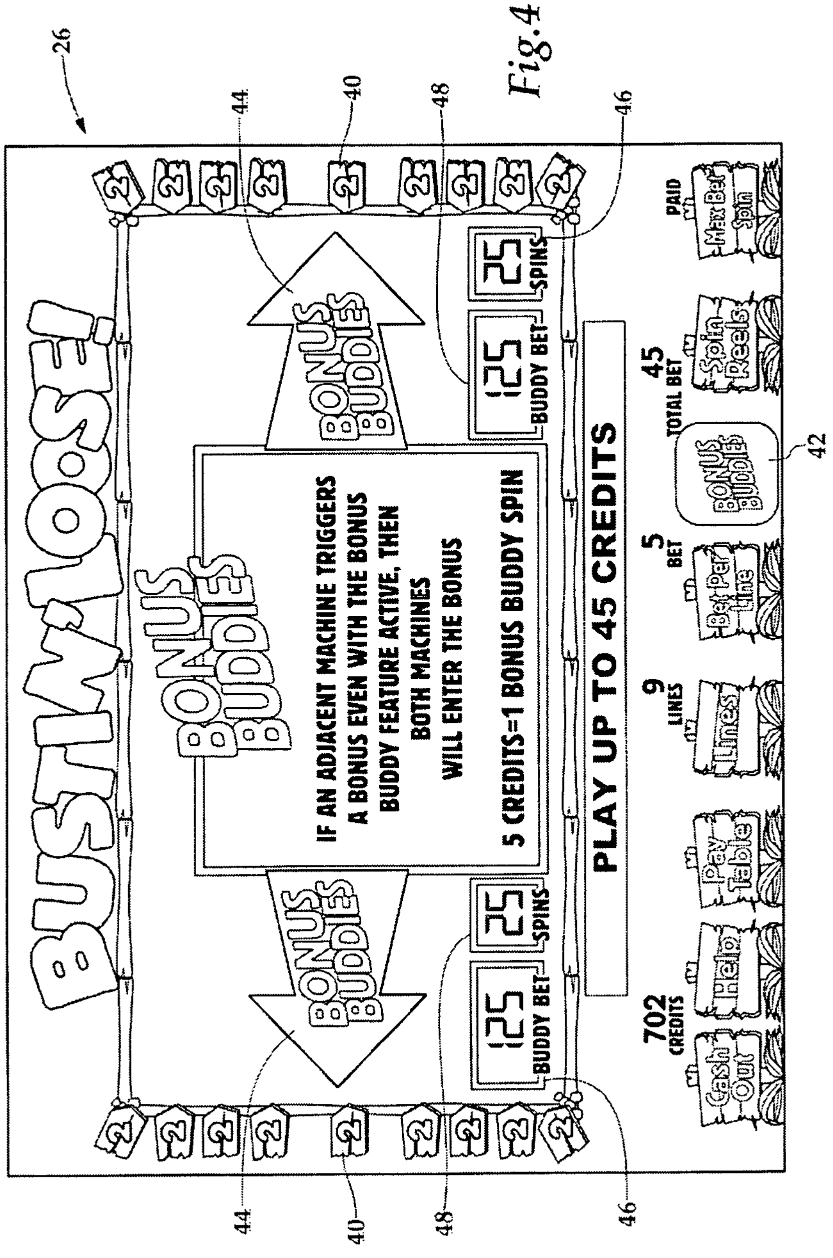
FIG. 4 illustrates a main display of a gaming terminal of FIG. 1 for displaying a player-selectable option for linking to other gaming terminals according to one embodiment of the present invention.

FIG. 4 shows a bonus game of the preferred embodiment with the player-selectable option 42 activated. Once activated, a player is allowed to link to a gaming terminal 10 by selecting at least one of the gaming terminals available for linking. For example, in FIG. 4, a player can select either or both adjacent terminals on the right or left by selecting the appropriate linking option 44. In other embodiments, a player may be allowed to select from a large number of gaming terminals available for linking that are located either in close proximity to or some distance from the gaming terminal 10. Alternatively, the game network 50 operates to select a gaming terminal 10 either randomly or based on predefined criteria.

As shown in FIG. 4, the player-selectable option 42 is activated by a wager input that is a minimum of 5 credits, i.e., 5 credits are equivalent to one spin on a linked gaming terminal. A player may choose to wager more than 5 credits. The wager input is indicated in the bet window 46. In FIG. 4, the bet window 46 indicates that a player has input 125 credits. As the minimum bet required to link to a gaming terminal 10 in this embodiment is 5 credits, a player has a total of 25 bets, or spins, of the linked gaming terminal. The total number of spins is reflected in the spin window 48. In the present embodiment, the player has chosen to wager the minimum amount of credits. However, a larger wager, i.e., up to 45 credits as a maximum, may be wagered in this particular embodiment. The larger the number of credits that are played, the larger the bonus award may be after entering a bonus game.

After selecting the gaming terminals and making a wager input, the gaming terminal 10 is then linked to the other gaming terminals via the game network 50. Upon being linked, the linked terminals continue game play as usual. In fact, the players playing at the linked terminals may not even be aware that their terminals have been linked to another terminal. Alternatively, the linked terminal may be provided with an indicator that it has been linked with another terminal.

Once the player has activated the linking option by placing a second wager input equal to the minimum bet (or using "Buddy" credits earned for linking to other terminals), the player continues to play the basic game. While playing the basic game, if the wagering game at one of the linked gaming terminals achieves an outcome that triggers a bonus game while the linking option is activated, then both the linked gaming terminal and the linking gaming terminal will enter a bonus game at that time. For example, in FIG. 4, if during 25 spins at the linked terminal a start-bonus-game outcome occurs, then the gaming terminal 10 that activated the linking option will also enter a bonus game. The bonus game at the linking gaming terminal may be similar to or different from the bonus game of the linked gaming terminals.

In the embodiment described in FIG. 4, a player can enter the bonus game at any point during the 25 spins that the linked gaming terminals achieve a start-bonus-game outcome. Thus, a player may enter the bonus game based on an outcome of a linked gaming terminal more than one time. In the same fashion, if the linked gaming terminals do not achieve a start-bonus-game outcome during any of the 25 spins, then the player will not enter the bonus game at any time based on the outcomes of the linked gaming terminals.

A gaming terminal may be linked even if it has already been linked to other gaming terminals. Additionally, in other embodiments, two gaming terminals may link to each other. For example, when a first gaming terminal links to a second gaming terminal, the second gaming terminal may be given the option of linking back to the first gaming terminal. Thus, once either gaming terminals achieves a start-bonus-game outcome, then the other gaming terminal enters a bonus game as well. This reciprocal feature may allow the second gaming terminal to link to the first gaming terminal for the same or lesser wager input than the first gaming terminal. This creates an incentive for linking of multiple gaming terminals and increases the excitement of the shared gaming experience.

There may be a time when a linked gaming terminal becomes inactive, such as when a player at the linked gaming terminal leaves the terminal while it is linked to another gaming terminal. When this occurs, a player who is linked to the linked gaming terminal may be given the option to continue the link at another active gaming terminal via a substitute terminal. This option to continue the link via a substitute terminal may appear at the player's gaming terminal within a certain amount of time, i.e., 1 minute, after the previously linked gaming terminal becomes inactive. Alternatively, the game network 50 may play the remaining spins at the linked gaming terminal via a quick-play, ghost player. Thus, the player at the linking gaming terminal enters a bonus game upon the ghost player achieving a bonus game once the game network 50 enters this quick-play mode.

Another embodiment of the present invention may include a designated gaming terminal that is linked to all other gaming terminals, i.e. a "Big-Brother" gaming terminal. The game being played at the designated gaming terminal can be displayed on a casino-wide video display that all players can watch. Any player at a gaming terminal who elects to link to the designated gaming terminal will enter a bonus game when the designated gaming terminal achieves a start-bonus-game outcome. Thus, a player may have the option of linking to selected gaming terminals, a designated gaming terminal, or both. This adds to an individual player's excitement, as more linking means more chances to enter a bonus game and win increased awards based on the game play at linked gaming terminals.

While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the claimed invention, which is set forth in the following claims.

What is claimed is:

1. A gaming terminal for playing a wagering game, the gaming terminal comprising:

a display device configured to display a wagering game having a plurality of symbols that indicate a randomly selected outcome in response to a wager input by a player;

a player-selectable input device configured to receive from said player an input to selectively link said gaming terminal to another gaming terminal; and a communications interface configured, in response to said player-selectable input device at said gaming terminal being activated, to link said gaming terminal to said another gaming terminal, wherein said gaming terminal and said another gaming terminal, when linked, each conduct a special event in response to a certain event occurring at said another gaming terminal, wherein the special event conducted at said gaming terminal is not influenced by the special event conducted at said another gaming terminal, and wherein said player at said gaming terminal participates in said special event at said gaming terminal to achieve a special event outcome for said gaming terminal, said special event outcome at said gaming terminal being different from a special event outcome achieved at said another gaming terminal.

2. The gaming terminal of claim 1, wherein said special event is a bonus game.

3. The gaming terminal of claim 1, wherein said player-selectable input device is further configured to receive from said player an input to select said another gaming terminal from at least two adjacent gaming terminals.

4. The gaming terminal of claim 1, wherein an option to selectively link to said another gaming terminal via said player-selectable input device is activated in response to a second wager input at said gaming terminal.

5. The gaming terminal of claim 4, wherein said second wager input corresponds to a predetermined number of spins at said another gaming terminal.

6. The gaming terminal of claim 1, wherein an option to selectively link to said another gaming terminal via said player-selectable input device is activated in response to achieving a certain outcome at said gaming terminal.

7. The gaming terminal of claim 6, wherein said certain outcome includes an award of credits to be used for linking to one or more plays of a wagering game at said another gaming terminal.

8. The gaming terminal of claim 6, wherein said certain outcome includes a certain symbol or combination of symbols appearing in the wagering game on the display device.

9. The gaming terminal of claim 1, wherein linking said gaming terminal to said another gaming terminal provides that game play at said gaming terminal is influenced by game play at said another gaming terminal.

10. The gaming terminal of claim 1, wherein a controller associated with said gaming terminal is configured to conduct the special event on said gaming terminal responsive to an occurrence of at least one predetermined event during game play at said gaming terminal.

11. A method of playing a wagering game at a gaming terminal, the method comprising:

providing said wagering game having a plurality of symbols that indicate a randomly selected outcome in response to a wager input by a player;

activating a player-selectable option on said gaming terminal for linking to a second gaming terminal;

linking said gaming terminal and said second gaming terminal; and providing a bonus game at each of said gaming terminals based on a start-bonus-outcome achieved at one of said gaming terminals, wherein the bonus game at said gaming terminal is a first bonus game and the bonus game at said second gaming terminal is a second bonus game, wherein the first bonus game conducted at said gaming terminal is not influenced by the second bonus game conducted at said second gaming terminal, and wherein the outcome of the first bonus game is different from an outcome of the second bonus game.

12. The method of claim 11, wherein said second gaming terminal is selected by said player from a plurality of gaming terminals.

13. The method of claim 11, wherein said second gaming terminal is selected by a player from adjacent gaming terminals.

14. The method of claim 11, wherein said second gaming terminal is randomly selected by a controller.

15. The method of claim 11, wherein said second gaming terminal is a designated gaming terminal.

16. The method of claim 15, wherein said designated gaming terminal is configured to display the wagering game on a casino-wide video display.

17. The method of claim 11, wherein said first bonus game at said gaming terminal may be independently triggered by said gaming terminal during game play at said gaming terminal.

18. A gaming system, comprising:

at least one gaming terminal, said at least one gaming terminal being linked to other gaming terminals based on input from a player at said at least one gaming terminal, said input allowing said player to choose to which of said other gaming terminals to link;

at least one controller operative to:

link said at least one gaming terminal with said other chosen gaming terminal, conduct a wagering game at said at least one gaming terminal and said other chosen gaming terminal, upon an occurrence of at least one predetermined event during game play at said other chosen gaming terminal, cause said other chosen gaming terminal to participate in a first special event game and cause said at least one gaming terminal to participate in a second special event game, the second special event game not being influenced by the first special event game, and an outcome of the first special event game being different from an outcome of the second special event game, and conduct the second special event game on said at least one gaming terminal responsive to an occurrence of at least one predetermined event during game play at said at least one gaming terminal.

19. The gaming system of claim 18, wherein said linking by said controller is activated via a wager input at said at least one gaming terminal.

20. The gaming system of claim 18, wherein said linking by said controller is activated by a special-event-outcome at said at least one gaming terminal.

21. The gaming system of claim 20, wherein said special-event-outcome includes an award of credits corresponding to one or more plays of said wagering game at said other chosen gaming terminal to be used by said at least one gaming terminal for said linking to said other chosen gaming terminal.

22. The gaming system of claim 18, wherein said game play at said other chosen gaming terminal includes a start-bonus-game outcome.

23. The gaming system of claim 18, wherein said game play at said other chosen gaming terminal influences game play at said at least one gaming terminal when said at least one gaming terminal is linked with said other chosen gaming terminal.

24. The gaming system of claim 18, wherein said at least one controller is configured to conduct the second special event game on said at least one gaming terminal responsive to an occurrence of at least one predetermined event during game play at said at least one gaming terminal.

* * * * *